(12) United States Patent
Kim et al.

(10) Patent No.: US 9,332,265 B2
(45) Date of Patent: *May 3, 2016

(54) MOVING PICTURE CODING/DECODING METHOD AND APPARATUS

(71) Applicant: SAMSUNG ELECTRONICS CO., LTD., Suwon-si, Gyeonggi-do (KR)

(72) Inventors: Wooshik Kim, Yongin-si (KR); Dmitri Birinov, Yongin-si (KR); Daesung Cho, Seoul (KR); Hyun Mun Kim, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,658

(22) Filed: Jan. 15, 2015

(65) Prior Publication Data

US 2015/0195556 A1    Jul. 9, 2015

Related U.S. Application Data

(63) Continuation of application No. 11/405,420, filed on Apr. 18, 2006, now Pat. No. 8,958,476.

(60) Provisional application No. 60/672,047, filed on Apr. 18, 2005.

(51) Int. Cl.
*H04N 7/12* (2006.01)
*H04N 19/136* (2014.01)
(Continued)

(52) U.S. Cl.
CPC ......... *H04N 19/136* (2014.11); *H04N 7/26335* (2013.01); *H04N 7/50* (2013.01); *H04N 19/0003* (2013.01); *H04N 19/00018* (2013.01); *H04N 19/00024* (2013.01); *H04N 19/00036* (2013.01); *H04N 19/00042* (2013.01); *H04N 19/00066* (2013.01); *H04N 19/00072* (2013.01);
(Continued)

(58) Field of Classification Search
CPC . H04N 7/50; H04N 7/26335; H04N 7/26244; H04N 7/26941
See application file for complete search history.

(56) References Cited

U.S. PATENT DOCUMENTS 5,485,279 A   1/1996   Yonemitsu et al.
5,740,305 A   4/1998   Murakami
(Continued)

FOREIGN PATENT DOCUMENTS

CN   1139860     1/1997
EP   1507415 A2  2/2005
(Continued)

OTHER PUBLICATIONS

U.S. Notice of Allowance dated Jul. 16, 2015 in copending U.S. Appl. No. 14/597,627.
(Continued)

*Primary Examiner* — Shawn An
(74) *Attorney, Agent, or Firm* — Staas & Halsey LLP

(57) ABSTRACT

An image decoding method is provided. The image decoding method includes obtaining information about a color representation from a bitstream, entropy decoding a residue, which corresponds to a difference between a current image and a predicted image of the current image, and reconstructing the current image by using the entropy decoded residue and the predicted image, based on the information about the color representation.

2 Claims, 14 Drawing Sheets

(51) Int. Cl.
| | |
|---|---|
| H04N 19/186 | (2014.01) |
| H04N 19/105 | (2014.01) |
| H04N 19/50 | (2014.01) |
| H04N 19/503 | (2014.01) |
| H04N 19/176 | (2014.01) |
| H04N 19/119 | (2014.01) |
| H04N 19/172 | (2014.01) |
| H04N 19/61 | (2014.01) |
| H04N 19/593 | (2014.01) |
| H04N 19/11 | (2014.01) |
| H04N 19/103 | (2014.01) |
| H04N 19/107 | (2014.01) |
| H04N 19/109 | (2014.01) |
| H04N 19/117 | (2014.01) |
| H04N 19/44 | (2014.01) |
| H04N 19/86 | (2014.01) |
| H04N 19/00 | (2014.01) |
| H04N 19/139 | (2014.01) |
| H04N 19/159 | (2014.01) |
| H04N 19/85 | (2014.01) |
| H04N 19/91 | (2014.01) |
| H04N 19/51 | (2014.01) |
| H04N 19/60 | (2014.01) |
| H04N 19/40 | (2014.01) |

(52) U.S. Cl.
CPC ... *H04N19/00266* (2013.01); *H04N 19/00278* (2013.01); *H04N 19/00315* (2013.01); *H04N 19/00569* (2013.01); *H04N 19/00575* (2013.01); *H04N 19/00763* (2013.01); *H04N 19/00781* (2013.01); *H04N 19/00909* (2013.01); *H04N 19/103* (2014.11); *H04N 19/105* (2014.11); *H04N 19/107* (2014.11); *H04N 19/109* (2014.11); *H04N 19/11* (2014.11); *H04N 19/117* (2014.11); *H04N 19/119* (2014.11); *H04N 19/139* (2014.11); *H04N 19/159* (2014.11); *H04N 19/172* (2014.11); *H04N 19/176* (2014.11); *H04N 19/186* (2014.11); *H04N 19/44* (2014.11); *H04N 19/50* (2014.11); *H04N 19/503* (2014.11); *H04N 19/51* (2014.11); *H04N 19/593* (2014.11); *H04N 19/60* (2014.11); *H04N 19/61* (2014.11); *H04N 19/85* (2014.11); *H04N 19/86* (2014.11); *H04N 19/91* (2014.11); *H04N 7/26244* (2013.01); *H04N 7/26941* (2013.01); *H04N 19/40* (2014.11)

(56) References Cited

U.S. PATENT DOCUMENTS

| | | | |
|---|---|---|---|
| 6,272,179 | B1 | 8/2001 | Kadono |
| 6,498,811 | B1 * | 12/2002 | Van Der Vleuten .... G10L 19/04 375/240 |
| 7,242,716 | B2 | 7/2007 | Koto et al. |
| 7,302,104 | B2 | 11/2007 | Suino |
| 7,469,069 | B2 * | 12/2008 | Kim ..................... H04N 19/105 375/E7.133 |
| 7,751,478 | B2 * | 7/2010 | Kim ..................... H04N 19/176 375/240.12 |
| 8,958,476 | B2 * | 2/2015 | Kim ................. H04N 19/00315 375/240.12 |
| 9,131,244 | B2 | 9/2015 | Kim |
| 2005/0013363 | A1 | 1/2005 | Cho et al. |
| 2015/0124868 | A1 | 5/2015 | Kim |
| 2015/0229923 | A1 | 8/2015 | Kim |

FOREIGN PATENT DOCUMENTS

| | | |
|---|---|---|
| JP | 2004-7379 | 1/2004 |
| JP | 2004-222027 | 8/2004 |
| KR | 10-2004-0099086 | 11/2004 |
| KR | 10-2005-0009216 | 1/2005 |
| KR | 10-2005-0009226 | 1/2005 |

OTHER PUBLICATIONS

Japanese Office Action mailed Jul. 2, 2013 in corresponding Japanese Application No. 2012-144782.
"Basic Technology in International Standard Image Encoding", First Edition, Corona, Inc., Mar. 20, 1998, pp. 293-294, ISBN:4-339-01161-4.
"Point Illustrating Up-to-date MPEG Textbook", First Edition, Aski, Inc., Aug. 1, 1994, pp. 125-128, 154, and 155, ISBN:4-7561-0247-6.
Japanese Non-Final Rejection dated Mar. 27, 2012 in corresponding Japanese Patent Application No. 2008-506386.
Notice of Allowance dated Dec. 18, 2012 in Korean Application No. 10-2006-0034672.
"Recent Trend in MPEG-4 Visual Encoding", Search Report Information Processing Society, vol. 2004, No. 25, Information Processing Society, pp. 85-90.
Japanese Office Action issued Mar. 8, 2011 in corresponding Japanese Patent Application 2008-506386.
Sullivan G. J. et al: "The H.264/AVC advanced video coding standard: overview and introduction to the fidelity range extensions", Proceedings of Spie, USA, vol. 5558, Nov. 1, 2004, pp. 454-474, XP002340590, ISSN: 0277-786X, DOI:10.1117/12.564457.
European Patent Office Action issued Mar. 3, 2011 corresponds to European Application No. 06 757 494.7-1247.
Chinese Office Action issued Apr. 24, 2009 in corresponding Chinese Patent Application No. 200680012739.8.
Extended European Search Report mailed on Jul. 6, 2009 in corresponding European Patent Application No. 06757494.7.
Examination Report dated Mar. 21, 2013 of the corresponding European Patent Application No. 06757494.7.
*Proposal for the unsolved issues in Professional Extensions II*, Woo-Shik Kim et al. Joint Video Team of ISO/IEC MPEG & ITU-T VCEG 10th JVT Meeting Dec. 8-12, 2003, Hawaii.
*Adapptive Residue Transform and Sampling*, Woo-Shik Kim et al. Joint Video Team of ISO/IEC MPEG & ITU-T VCEG 11th JVT Meeting: Munich, Germany, Mar. 15-19, 2004.
*Enhancements to RGB coding in N.264/MPEG-4 AVC Frext*, Woo-Shik Kim et al. ITU-Telecommunications Standardization Sector, Study Group 16 Question 6, Video Coding Experts Group (VCEG) 26$^{th}$ Meeting: Busan, Korea, Apr. 16-22, 2005.
*Overview of the H.264/AVC Video Coding Standard*, Thomas Wiegand et al. IEEE Transactions on Circuits and System for Video Technology, vol. 13, No. 7, Jul. 2003.
International Search Report with Written Opinion mailed Jul. 26, 2006 in related International Application No. PCT/KR2006/001440.
Yu-Kun Lin et al., Abstract of "Fast Block type decision algorithm for intra prediction in H.264 FRext", IEEE International Conference on Image Processing, Sep. 11-14, 2005, vol. 1.
Gary Sullivan et al., "Draft Text of H.264/AVC Fidelity Range Extensions Amendment", Advanced Video Coding, Joint Video Team (JVT) of ISO/IEC MPEG & ITU-T VCEG (ISO/IEC JTC1/SC29/WG11 and ITU-T SG16 Q.6), 12$^{th}$ Meeting: Redmond, WA, USA, Jul. 17-23, 2004, pp. 1-129.
Detlev Marpe et al., "H.264/MPEG4-AVC Fidelity Range Extensions: Tools, Profiles, Performance, and Application Areas," IEEE International Conference on Image Processing, vol. 1, 4 pp., Sep. 2005.
Japanese Final Rejection mailed Feb. 4, 2014 in related Japanese Application No. 2012-144782.
Office Action mailed Feb. 1, 2011 in related U.S. Appl. No. 11/405,420.
Final Office Action mailed Oct. 25, 2011 in related U.S. Appl. No. 11/405,420.
Office Action mailed Jun. 27, 2012 in related U.S. Appl. No. 11/405,420.

(56) References Cited

OTHER PUBLICATIONS

Final Office Action mailed Apr. 11, 2013 in related U.S. Appl. No. 11/405,420.
Office Action mailed Apr. 3, 2014 in related U.S. Appl. No. 11/405,420.
Notice of Allowance mailed Oct. 17, 2014 in related U.S. Appl. No. 11/405,420.
Japanese First Office Action issued Jun. 30, 2015 in corresponding Japanese Application No. 2014-116289.
Woo-Shik Kim et al., "Color Format Extension", [Online], Jan. 17, 2005, Joint Video Team (JVT) of ISO/IEC MPEG & ITU-T VCEG (ISO/IEC JTC1/SC29/WG11 and ITU-TSG16 Q.6), Document: JVT-H018. (Date Saved May 20, 2003).
Woo-Shik Kim et. al., Color Format Extension, Joint Video Team (JVT) of ISO/IEC MPEG & ITU-T VCEG (ISO/IEC JTC1/SC29/WG11 and ITU-T SG16 Q.6) Document: JVT-H018, May 2003, pp. 1-14, URL: http://wftp3.itu.int/av-arch/jvt-site/2003_05_geneva/jvt-h018.doc.
Technology Explanation, Explanation on MPEG-4 AVC/H.264 Standard, Image Formation Media Society Paper, vol. 58, No. 8 (Aug. 2004), Image Information Media Society, Aug. 1, 2004, pp. 1146-1150, ISSN: 1342-6907.
Japanese Trial Decision issued Sep. 8, 2015 in corresponding Japanese Application No. 2012-144782.
U.S. Office Action dated Sep. 30, 2015 in copending U.S. Appl. No. 14/693,061.
U.S. Office Action dated Oct. 1, 2015 in copending U.S. Appl. No. 14/693,070.
Notice of Allowance mailed Jan. 6, 2016 in copending U.S. Appl. No. 14/693,061.
Notice of Allowance mailed Jan. 21, 2016 in copending U.S. Appl. No. 14/693,070.

* cited by examiner

FIG. 10

Table 1001:

| | RGB PSNR | | | | | |
|---|---|---|---|---|---|---|
| | 20 Mbps | | | 60 Mbps | | |
| | RCT (FREXT) | RCT | IPP | RCT (FREXT) | RCT | IPP |
| Analog TV | 0.1 | 0.2 | 0.3 | 0.1 | 0.2 | 0.9 |
| CardToss | 0.0 | 0.2 | 0.4 | 0.0 | 0.2 | 0.9 |
| Dinner | 0.0 | 0.2 | 0.4 | 0.0 | 0.1 | 0.5 |
| tomatoes | 0.0 | 0.1 | 0.1 | -0.1 | 0.2 | 0.2 |
| Breeze | 0.1 | 0.2 | 0.0 | 0.2 | 0.4 | 0.0 |
| Average | 0.0 | 0.1 | 0.2 | 0.0 | 0.2 | 0.5 |

Table 1002:

| | Y PSNR | | | | | |
|---|---|---|---|---|---|---|
| | 20 Mbps | | | 60 Mbps | | |
| | RCT (FREXT) | RCT | IPP | RCT (FREXT) | RCT | IPP |
| Analog TV | 0.2 | 0.2 | 0.7 | 0.2 | 0.4 | 1.5 |
| CardToss | 0.2 | 0.3 | 0.8 | 0.2 | 0.4 | 1.5 |
| Dinner | 0.2 | 0.4 | 0.7 | 0.2 | 0.3 | 1.5 |
| tomatoes | 0.1 | 0.2 | 0.3 | 0.0 | 0.3 | 0.4 |
| Breeze | 0.2 | 0.3 | 0.3 | 0.3 | 0.4 | 0.5 |
| Average | 0.2 | 0.3 | 0.6 | 0.2 | 0.3 | 1.1 |

MOVING PICTURE CODING/DECODING METHOD AND APPARATUS

CROSS-REFERENCE TO RELATED APPLICATION

This application is a continuation application of U.S. Ser. No. 11/405,420 filed in the United States on Apr. 18, 2006, which claims the benefit of U.S. Provisional Patent Application No. 60/672,047, filed on Apr. 18, 2005, in the U.S. Trademark and Patent Office, the disclosures of which are incorporated herein by reference.

BACKGROUND OF THE INVENTION

1. Field of the Invention

The present invention relates to a moving picture coding/decoding method and apparatus, and more particularly, to a moving picture coding/decoding method and apparatus using the H.264/MPEG-4 AVC FRExt (Advanced Video Coding Fidelity Range Extensions) standard.

2. Description of Related Art

A new RGB coding technology referred to as "residual color transform" was developed during the development of the H.264/MPEG-4 AVC FRExt standard. This technology is for preventing image quality deterioration that occurs when a transform from a RGB color space to a YCbCr color space is performed. However, RGB coding technologies according to H.264/MPEG-4 AVC FRExt still do not ensure a sufficiently high coding efficiency to be applied to moving picture reproducing apparatuses.

Thus, there is a need for coding technologies according to H.264/MPEG-4 AVC FRExt that ensure a sufficiently high coding efficiency to be applied to moving picture reproducing apparatuses.

BRIEF SUMMARY

An aspect of the present invention provides a moving picture coding/decoding method and apparatus that can increase the coding efficiency of a moving picture using a RGB coding technology according to H.264/MPEG-4 AVC FRExt.

An aspect of the present invention also provides a computer readable recording medium having embodied thereon a computer program for the moving picture coding/decoding method.

According to an aspect of the present invention, there is provided a moving picture coding method comprising: (a) selecting a prediction mode to be commonly applied to all the color components constituting a color space; (b) generating first residual data corresponding to differences between a current picture and a predicted picture for each of the color components according to the prediction mode selected in operation (a); (c) generating second residual data corresponding to differences between the first residual data for each of the color components; and (d) coding the generated second residual data.

According another aspect of the present invention, there is provided a computer readable recording medium having embodied thereon a computer program for the above-described moving picture coding method.

According to another aspect of the present invention, there is provided a moving picture coding apparatus comprising: a selection unit selecting a prediction mode to be commonly applied to all the color components constituting a color space; a subtractor generating first residual data corresponding to differences between a current picture and a predicted picture for each of the color components according to the prediction mode selected by the selection unit; a transform unit generating second residual data corresponding to differences between the first residual data generated by the subtractor; and a coding unit coding the second residual data generated by the transform unit.

According to another aspect of the present invention, there is provided a moving picture coding method comprising: (a) selecting a color space from among a plurality of color spaces; (b) generating first residual data corresponding to differences between a current picture and a predicted picture for each of the color components constituting the selected color space; (c) generating second residual data corresponding to differences between the generated first residual data; and (d) coding the generated second residual data.

According to another aspect of the present invention, there is provided a computer readable recording medium having embodied thereon a computer program for the above-described moving picture coding method.

According to another aspect of the present invention, there is provided a moving picture coding apparatus comprising: a selection unit selecting a color space from among a plurality of color spaces; a subtractor generating first residual data corresponding to differences between a current picture and a predicted picture for each of the color components constituting the color space selected by the selection unit; a transform unit generating second residual data corresponding to differences between the first residual data generated by the subtractor; and a coding unit coding the second residual data generated by the transform unit.

According to another aspect of the present invention, there is provided a moving picture coding method comprising: (a) selecting a color space from among a plurality of color spaces; (b) selecting a prediction mode to be commonly applied to all the color components constituting the selected color space; (b) generating first residual data corresponding to differences between a current picture and a predicted picture for each of the color components constituting the selected color space according to the selected prediction mode; (c) generating second residual data corresponding to differences between the generated first residual data; and (d) coding the generated second residual data.

According to another aspect of the present invention, there is provided a computer readable recording medium having embodied thereon a computer program for the above-described moving picture coding method.

According to another aspect of the present invention, there is provided a moving picture coding apparatus comprising: a first selection unit selecting a color space from among a plurality of color spaces; a second selection unit selecting a prediction mode to be commonly applied to all the color components constituting the color space selected by the first selection unit; a subtractor generating first residual data corresponding to differences between a current picture and a predicted picture for each of the color components according to the prediction mode selected by the second selection unit; a transform unit generating second residual data corresponding to differences between the first residual data generated by the subtractor; and a coding unit coding the second residual data generated by the transform unit.

According to another aspect of the present invention, there is provided a moving picture coding method comprising: (a) selecting first prediction modes to be independently applied to color components constituting a color space or a second prediction mode to be commonly applied to all the color components of the color space; and (b) generating first residual data corresponding to differences between a current picture and a predicted picture for each of the color components according to the first prediction modes or the second prediction mode selected in operation (a).

According to another aspect of the present invention, there is provided a computer readable recording medium having embodied thereon a computer program for the above-described moving picture coding method.

According to another aspect of the present invention, there is provided a moving picture coding apparatus comprising: a selection unit selecting first prediction modes to be independently applied to color components constituting a color space or a second prediction mode to be commonly applied to all the color components of the color space; and a subtractor generating first residual data corresponding to differences between a current picture and a predicted picture for each of the color components according to the first prediction modes or the second prediction mode selected by the selection unit.

According to another aspect of the present invention, there is provided a moving picture decoding method comprising: (a) generating second residual data corresponding to differences between first residual data by decoding a bitstream; (b) generating the first residual data corresponding to the sum of the generated second residual data in a color space; (c) generating a prediction picture for each color component constituting the color space according to a prediction mode that is commonly applied to all the color components; and (d) generating a reconstructed picture corresponding to the sum of the generated first residual data and the generated predicted pictures.

According to another aspect of the present invention, there is provided a computer readable recording medium having embodied thereon a computer program for the above-described moving picture decoding method.

According to another aspect of the present invention, there is provided a moving picture decoding apparatus comprising: a decoding unit generating second residual data corresponding to differences between first residual data by decoding a bitstream; an inverse transform unit generating first residual data corresponding to the sum of the generated second residual data in a color space; a prediction unit generating a prediction picture for each color component constituting the color space according to a prediction mode that is commonly applied to all the color components; and an adder generating a reconstructed picture corresponding to the sum of the first residual data generated by the inverse transform unit and the predicted pictures generated by the prediction unit.

According to another aspect of the present invention, there is provided a moving picture decoding method comprising: (a) generating second residual data corresponding to differences between first residual data by decoding a bitstream; (b) generating the first residual data corresponding to the sum of the generated second residual data in a color space selected from among a plurality of color spaces; (c) generating a reconstructed picture corresponding to the sum of the generated first residual data and predicted pictures.

According to another aspect of the present invention, there is provided a computer readable recording medium having embodied thereon a computer program for the above-described moving picture decoding method.

According to another aspect of the present invention, there is provided a moving picture decoding apparatus comprising: a decoding unit generating second residual data corresponding to differences between first residual data by decoding a bitstream; an inverse transform unit generating the first residual data corresponding to the sum of the generated second residual data in a color space selected from among a plurality of color spaces; and an adder generating a reconstructed picture corresponding to the sum of the first residual data generated by the inverse transform unit and predicted pictures.

According to another aspect of the present invention, there is provided a moving picture decoding method comprising: (a) generating second residual data corresponding to differences between first residual data by decoding a bitstream; (b) generating the first residual data corresponding to the sum of the generated second residual data in a color space selected from among a plurality of color spaces; (c) generating a predicted picture for each color component of the color space according to a prediction mode that is commonly applied to all the color components; and (d) generating a reconstructed picture corresponding to the sum of the generated first residual data and the generated predicted pictures.

According to another aspect of the present invention, there is provided a computer readable recording medium having embodied thereon a computer program for the above-described moving picture decoding method.

According to another aspect of the present invention, there is provided a moving picture decoding apparatus comprising: a decoding unit generating second residual data corresponding to differences between first residual data by decoding a bitstream; an inverse transform unit generating the first residual data corresponding to the sum of the generated second residual data in a color space selected from among a plurality of color spaces; a prediction unit generating a predicted picture for each of the color components constituting the color space according to a prediction mode that is commonly applied to all the color components; and an adder generating a reconstructed picture corresponding to the sum of the first residual data generated by the inverse transform unit and the predicted pictures generated by the prediction unit.

According to another aspect of the present invention, there is provided a moving picture decoding method comprising: (a) generating a prediction picture for each color component constituting the color space according to first prediction modes that are independently applied to the color components constituting the color space or a second prediction mode that is commonly applied to all the color components; and (b) generating a reconstructed picture based on the generated predicted pictures.

According to another aspect of the present invention, there is provided a computer readable recording medium having embodied thereon a computer program for the above-described moving picture decoding method.

According to another aspect of the present invention, there is provided a moving picture decoding apparatus comprising: a prediction unit generating a prediction picture for each color component constituting the color space according to first prediction modes that are independently applied to the color components constituting the color space or a second prediction mode that is commonly applied to all the color components constituting the color space; and an adder generating a reconstructed picture based on the predicted pictures generated by the prediction unit.

According to another aspect of the present invention, there is provided an image decoding method comprising: obtaining information about a color representation from a bitstream, entropy decoding a residue, which corresponds to a difference between a current image and a predicted image of the current image, and reconstructing the current image by using the entropy decoded residue and the predicted image, based on the information about the color representation, wherein the reconstructing of the current image comprises: obtaining a prediction direction of a chroma component from among a plurality of prediction directions associated with a prediction direction of a luma component, wherein the plurality of prediction modes include a first mode in which the prediction direction of the chroma component is identical to the prediction direction of the luma component and a second mode in which the prediction direction of the chroma component is different from the prediction direction of the luma component; and obtaining the predicted image based on the prediction direction of the luma component and the prediction direction of the chroma component.

According to another aspect of the present invention, there is provided a method, wherein the information about the color representation indicates a color space into which color components are represented.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 10 is the results of a simulation test according to embodiments of the present invention.

DETAILED DESCRIPTION OF EMBODIMENTS

Figure 1:
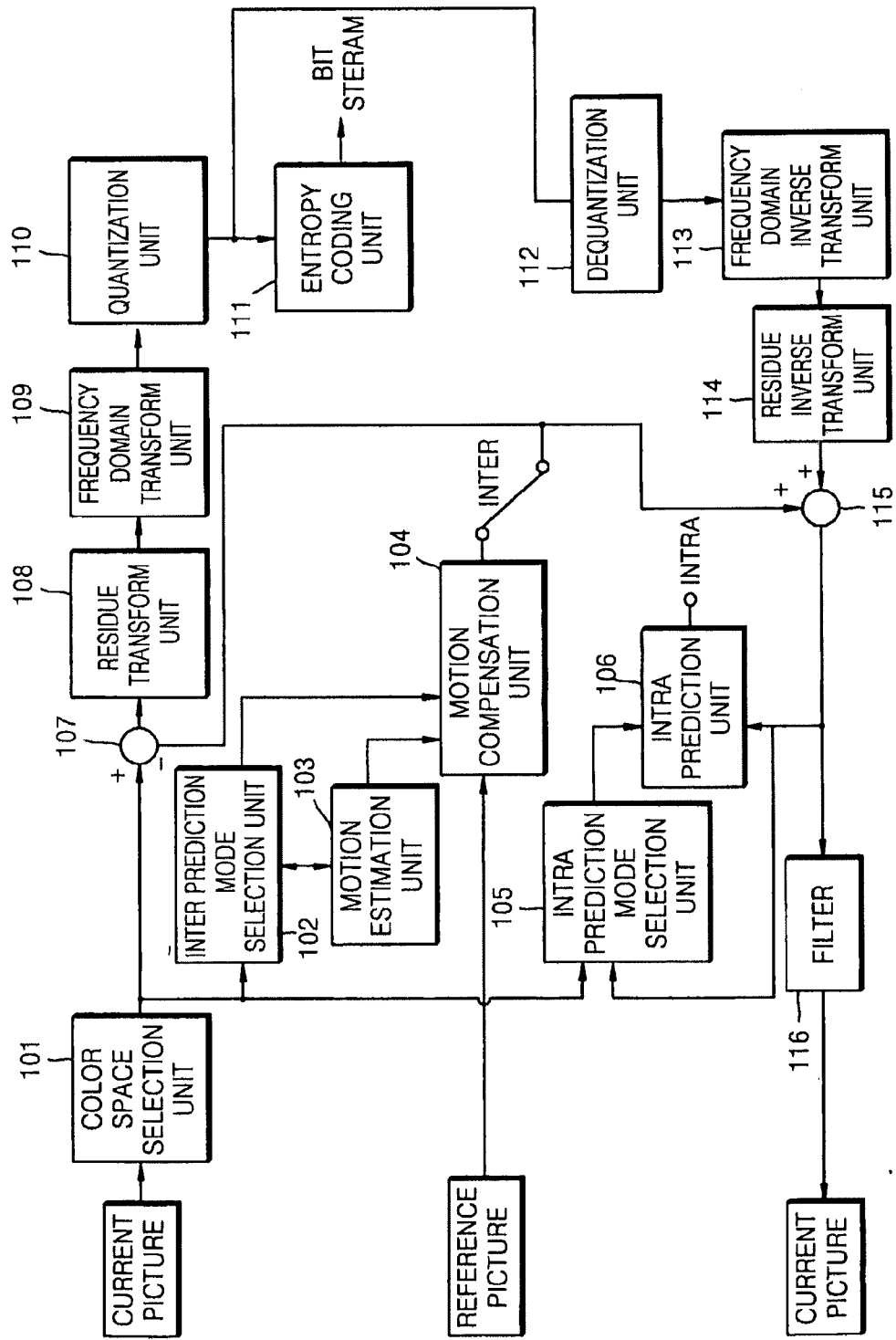
FIG. 1 is a block diagram of a moving picture coding apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a moving picture coding apparatus according to an embodiment of the present invention.

Referring to FIG. 1, a moving picture coding apparatus according to an embodiment of the present invention includes a color space selection unit 101, an inter prediction mode selection unit 102, a motion estimation unit 103, a motion compensation unit 104, an intra prediction mode selection unit 105, an intra prediction unit 106, a subtractor 107, a residue transform unit 108, a frequency domain transform unit 109, a quantization unit 110, an entropy coding unit 111, an dequantization unit 112, a frequency domain inverse transform unit 113, a residue inverse transform unit 114, an adder 115, and a filter 116.

The color space selection unit 101 adaptively selects a color space from among a plurality of color spaces based on the characteristics of a current picture. Non-limiting examples of color spaces include a YCgCo color space and a RGB color space. In the YCgCo color space, Y indicates a luma component, Co indicates a chroma orange component, and Cg indicates a chroma green component. In the RGB color space, R indicates red color component, G indicates a green color component, and B indicates a blue color component.

A scheme of coding a current picture will be referred to hereafter as "residual color transform" or (RCT) in the YCgCo color space and as "inter-plane prediction" or (IPP) in the RGB color space.

The RGB color space includes an R component, a G component, and a B component which can be perceived by humans. Accordingly, when the color space selection unit 101 selects another color space, for example, the YCgCo color space, not the RGB color space, after coding has been performed in the YCgCo color space, a transform from the YCgCo color space to the RGB color space should be performed.

According to the results of numerous experiments performed using sets of high quality images, such as high definition (HD) moving pictures, film scan images, Thompson Viper sequences, etc., there is no panacea for images having various characteristics and bit rates. Some images contain serious film grain noise in a color component, other images contain thermal noise, and other images have saturated color characteristics. RCT is efficient in a certain case, and IPP is efficient in another case. Therefore, in the present embodiment, one of RCT and IPP is adaptively used according to image characteristics. A moving picture decoding apparatus may be informed as to which of RCT and IPP is used in the moving picture coding apparatus by a single bit flag according to H.264/MPEG-4 AVC FRExt.

In a high bit rate environment, the coding efficiency of moving pictures is higher in RCT than in IPP. However, in RCT, due to the transform between different color spaces, the image quality deteriorates. Especially, when many noise components exist in a current picture or when the configuration of a current picture is complex, such image quality deterioration is serious. The color space selection unit 101 selects the RGB color space when many noise components exist in a current picture or when the configuration of a current picture is complex, or the YCgCo color space when almost no noise components exist in a current picture or when the configuration of a current picture is simple. In other words, the color space selection unit 101 adaptively selects a color space based on the characteristics of the moving picture, such as bit rate, coded sequences, etc.

The inter prediction mode selection unit 102 selects inter prediction modes to be independently applied to the color components constituting the color space selected by the color selection unit 101 or a single inter prediction mode to be commonly applied to all the color components constituting the color space selected by the color space selection unit 101. In general, when all color components have different motion vectors in an inter prediction mode, residual data of the all color components have different characteristics, and thus there is almost no correlation between the residual data of the different color components. Thus, in the present embodiment, the use of a single prediction mode, i.e., a single block size, a single motion vector, etc., for all the color components is suggested to increase the correlation between the residual data of the different color components. The use of a single prediction mode provides more natural images than when RGB components have similar texture characteristics. In addition, a moving picture decoding apparatus may be informed as to which of a single mode and a conventional independent mode is used in the moving picture coding apparatus by a single bit flag according to H.264/MPEG-4 AVC FRExt.

A case where the inter prediction mode selection unit 102 selects a single mode will be described in detail. The inter prediction mode selection unit 102 selects a size of blocks to be commonly applied to all the color components constituting the color space selected by the color space selection unit 101. The sizes of blocks constituting the current picture can be 16×16, 16×8, 8×1, 8×8, 8×4, 4×8, 4×4, etc. In general, a 16×16 block is referred to as "macroblock", and blocks obtained by dividing a macroblock to various sizes are referred as to "subblocks". Moving picture coding and decoding are performed in such block units. A portion of a moving picture that requires more accurate coding and decoding is coded and decoded in smaller block units.

In particular, the inter prediction mode selection unit 102 selects a size of blocks to be commonly applied to all color components. For example, the inter prediction mode selection unit 102 selects a size of blocks to be commonly applied to the Y component, the Co component, and the Cg component from among the sizes of blocks of the Y component, the sizes of blocks of the Cg component, and the sizes of blocks of the Cg component. Alternatively, the inter prediction mode selection unit 102 selects a size of blocks to be commonly applied to the R component, the G component, and the B component from among the sizes of blocks of the R component, the sizes of blocks of the G component, and the sizes of the blocks of the B component.

Figure 2:
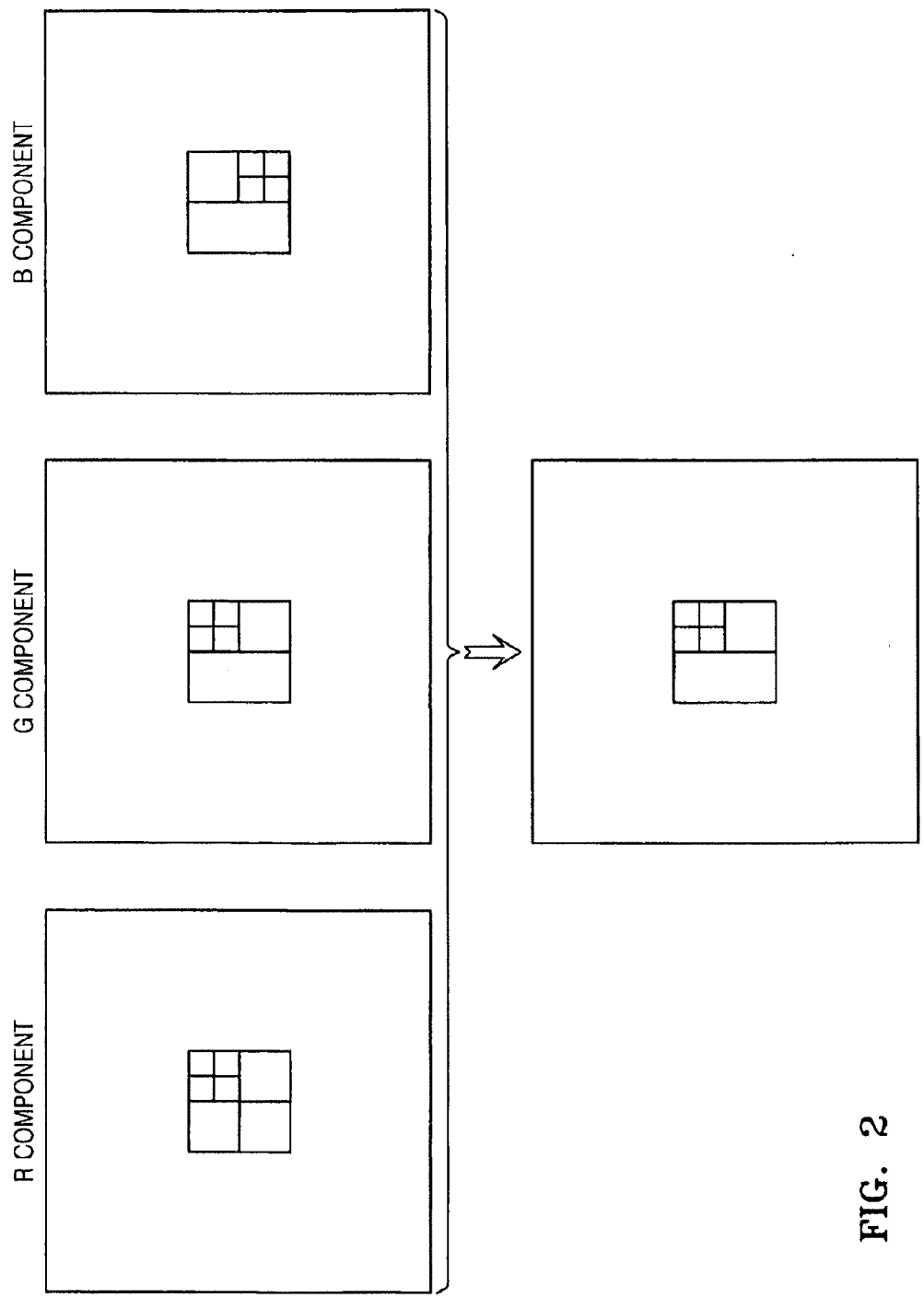
FIG. 2 illustrates the selection of a size of blocks in the moving picture coding apparatus of FIG. 1.

FIG. 2 illustrates the selection of a size of blocks in the moving picture coding apparatus of FIG. 1.

Referring to FIGS. 1 and 2, the inter prediction mode selection unit 102 selects a size of blocks that is optimal to the macroblocks of all the color components and are commonly applied to all the color components from among the sizes of blocks constituting a macroblock of the R component, the sizes of blocks constituting a macroblock of the G component, and the sizes of blocks constituting a macroblock of the B component. This selection can apply to the YCgCo color space.

Next, the inter prediction mode selection unit 102 selects a single motion vector to be commonly applied to all the color components constituting the color space from among motion vectors of all the color components in units of blocks corresponding to the selected size of blocks. In particular, the inter prediction mode selection unit 102 selects a single motion vector to be commonly applied to all the color components from among the motion vectors of the color components calculated by the motion estimation unit 103. For example, the inter prediction mode selection unit 102 selects a single motion vector to be commonly applied to all the Y component, Co component, and Cg component from among the motion vector of the Y component, the motion vector of the Co component, and the motion vector of the Cg component that are calculated by the motion estimation unit 103. Alternatively, the inter prediction mode selection unit 102 selects a single motion vector to be commonly applied to all the R component, G component, and B component from among a motion vector of the R component, a motion vector of the G component, and a motion vector of the B component that are calculated by the motion estimation unit 103.

Figure 3:
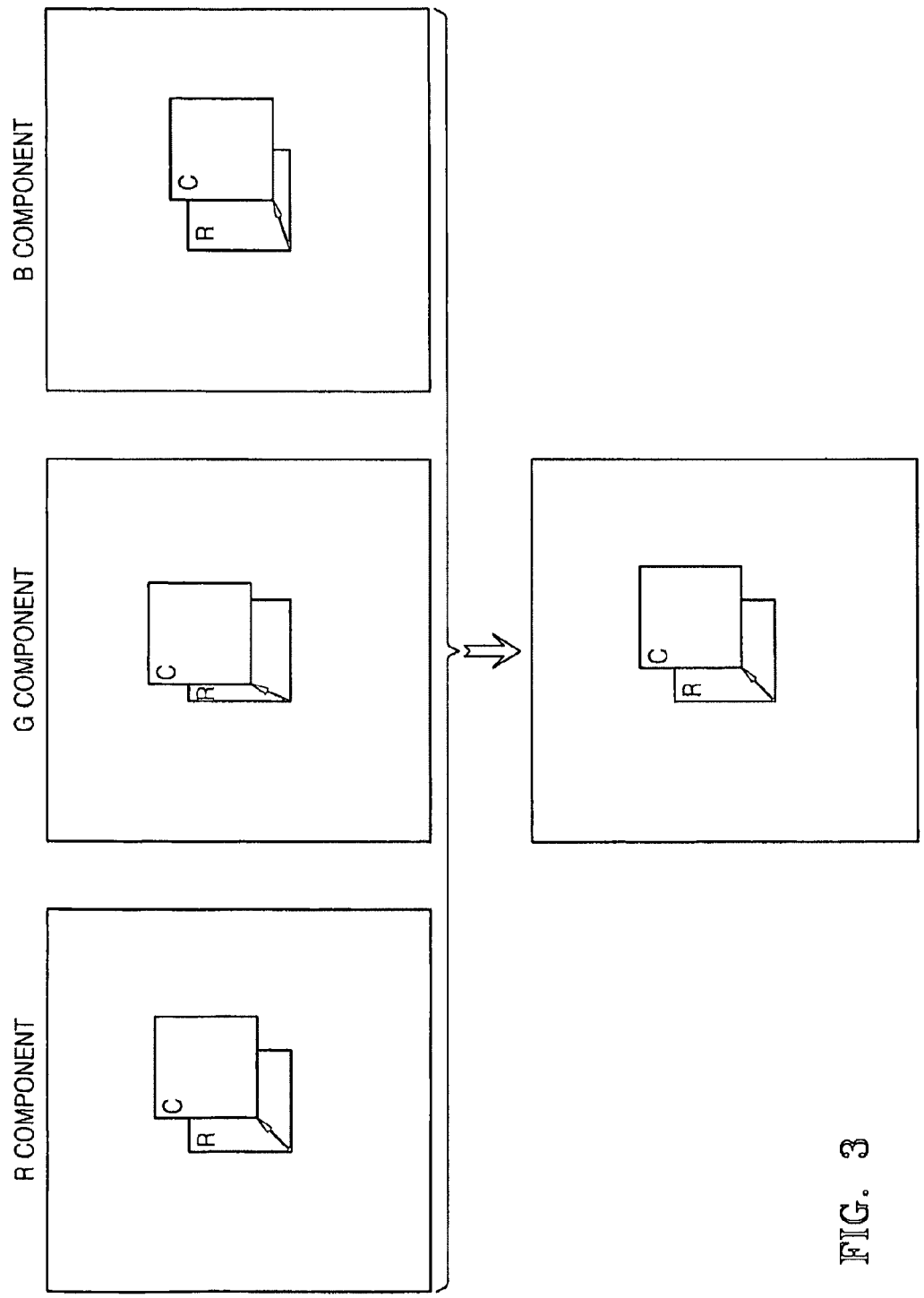
FIG. 3 illustrates the selection of a motion vector in the moving picture coding apparatus of FIG. 1.

FIG. 3 illustrates the selection of a motion vector in the moving picture coding apparatus of FIG. 1.

Referring to FIGS. 1 and 3, the inter prediction mode selection unit 102 selects a single motion vector that is optimal to the blocks of all the color components from among the motion vector for a block of the R component, the motion vector for a block of the G component, and the motion vector for a block of the B component. This selection can apply to the YCgCo color space.

The motion estimation unit 103 estimates motion in the current picture for each color component based on a reference picture according to an inter prediction mode selected by the inter prediction mode selection unit 102. In particular, the motion estimation unit 103 selects motion vectors to be independently applied to the color components constituting the color space in units of blocks that are independent for the color components or selects a motion vector to be commonly applied to the color components constituting the color spaces in units of blocks that are common to all the color components according to the inter prediction mode selected by the inter prediction mode selection unit 102.

A case where the motion estimation unit 103 estimates motion according to a single mode will be described. The motion estimation unit 103 calculates a motion vector corresponding to the displacement in the current picture with respect to the reference picture in units of blocks corresponding to the size of blocks selected by the inter prediction mode selection unit 102. In the present embodiment, the current picture refers to an object picture on which coding and decoding are performed. The reference picture indicates a picture referred to when coding or decoding the current picture. In general, a picture preceding the current picture is used as a reference picture. However, a picture following the current picture also can be sued as a reference picture. Alternatively, a plurality of reference pictures can be used.

For example, the motion estimation unit 103 calculates a motion vector of the Y component, a motion vector of the Co component, and a motion vector of the Cg component by estimating motion in the current picture for each of the Y component, Co component, and Cg component based on the reference picture according to the inter prediction mode selected by the inter prediction mode selection unit 102. Alternatively, the motion estimation unit 103 calculates a motion vector of the R component, a motion vector of the G component, and a motion vector of the B component by estimating motion in the current picture for each of the R component, G component, and B component based on the reference picture according to the inter prediction mode selected by the prediction mode selection unit 102.

The motion compensation unit 104 compensates for the motion between the current picture and the reference picture according to the inter prediction mode selected by the inter prediction mode selection unit 102. In particular, the motion compensation unit 104 generates a predicted picture in the current picture from the reference picture in units of blocks corresponding to the size of blocks selected by the inter prediction mode selection unit 102 using the motion vector selected by the inter prediction mode selection unit 102. The inter prediction performed by the motion estimation unit 103 and the motion compensation unit 104 is for removing temporal redundancy between the current picture and the reference picture.

For example, the motion compensation unit 104 generates a predicted picture for the Y component, a predicted picture for the Co component, and a predicted picture for the Cg component by compensating for the motion between the current picture and the reference picture according to the inter prediction mode selected by the inter prediction mode selection unit 102. Alternatively, the motion compensation unit 104 generates a predicted picture for the R component, a predicted picture for the G component, and a predicted picture for the B component by compensating for the motion between the current picture and the reference picture according to the inter prediction mode selected by the inter prediction mode selection unit 102.

The intra prediction mode selection unit 105 selects intra prediction modes to be independently applied to the color components constituting the color space selected by the color space selection unit 101 or a single intra prediction mode to be commonly applied to all the color components constituting the color space selected by the color space selection unit 101. According to MPEG-4 AVC/H.264 video coding schemes, there are 9 intra prediction modes in units of 4×4 blocks and 4 intra prediction modes in units of 16×16 blocks for a luma component, and 4 intra prediction modes in units of 8×8 blocks for a chroma component. In general, since prediction modes for the luma component and the chroma component are different, the correlation between the color components is low, which is disadvantageous in RCT, IPP, or other similar transforms. The coding efficiency for moving pictures can be increased by applying a single intra prediction mode to all the color components. Therefore, in the present embodiment, an intra prediction mode in units of 4×4, 8×8, or 16×16 blocks for the luma component is applied to the chroma component.

The intra prediction mode selection unit 105 selects prediction directions to be independently applied to the color components constituting the color space, or selects a prediction direction to be commonly applied to all the color components constituting the color space from among prediction directions for the color components constituting the color space according to the intra prediction mode selected by the intra prediction mode selection unit 105. A case where the intra prediction mode selection unit 105 selects a single mode will be described in detail. The intra prediction mode selection unit 105 selects a size of blocks to be commonly applied to all the color components constituting the color space selected by the color space selection unit 101. The sizes of blocks constituting the current picture can be 16×16, 8×8, 4×4, etc. The selection of a size of blocks for intra prediction is performed in the same manner as for the inter prediction illustrated in FIG. 2.

Next, the intra prediction mode selection unit 105 selects a single prediction direction to be commonly applied to all the color components constituting the color space in units of blocks corresponding to the size of blocks selected above from among prediction directions of the color components constituting the color space. For example, the intra prediction mode selection unit 105 selects a single prediction direction to be commonly applied to the Y component, Co component, and Cg component from among a prediction direction of the Y component, a prediction direction of the Co component, and a prediction direction of the Cg component. Alternatively, the intra prediction mode selection unit 105 selects a single prediction direction to be commonly applied to the R component, G component, and B component from among a prediction direction of the R component, a prediction direction of the G component, and a prediction direction of the B component.

Figure 4:
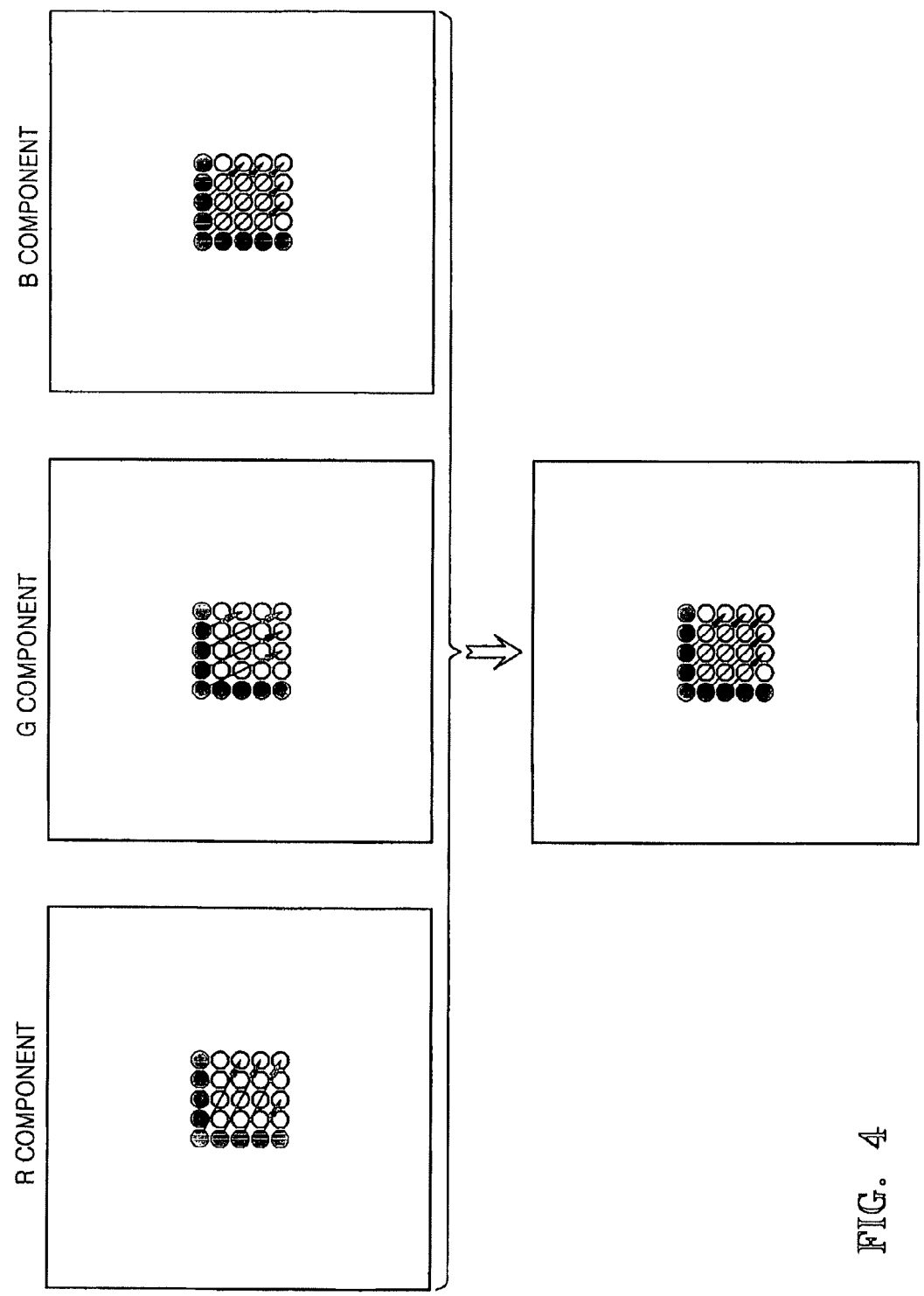
FIG. 4 illustrates the selection of a prediction direction in the moving picture coding apparatus in FIG. 1.

FIG. 4 illustrates the selection of a prediction direction in the moving picture coding apparatus of FIG. 1.

Referring to FIGS. 1 and 4, the intra prediction mode selection unit 105 selects a single prediction direction that is optimal to the blocks of all the color components and is to be commonly applied to all the color components from among a prediction direction for a block in the R component, a prediction direction for a block in the G component, and a prediction direction for a block in the B component. This selection can apply to the YCgCo color space.

The intra prediction unit 106 estimates blocks constituting the current picture from adjacent pixels in a picture reconstructed by an adder 115, according to the intra prediction mode selected by the intra prediction mode selection unit 105, and generates a predicted picture constituted by the predicted blocks. In particular, the intra prediction unit 106 estimates blocks constituting the current picture from adjacent pixels indicated by the prediction directions, which are independently applied to the color components of the color space, in units of blocks that are independent for the color components, and generates a predicted picture constituted by the predicted blocks. Alternatively, the intra prediction unit 106 estimates blocks constituting the current picture from adjacent pixels indicated by the prediction direction, which is commonly applied to all the color components of the color space, in units of blocks that are common to all the color components, and generates a predicted picture constituted by the prediction direction. The intra prediction performed by the intra prediction unit 106 is for removing spatial redundancy in the current picture.

For example, the intra prediction unit 106 predicts blocks constituting the current picture from adjacent pixels for each of the Y component, Co component, and Cg component indicated by the prediction direction selected by the intra prediction mode selection unit 105 and generates a predicted picture for the Y component, a predicted picture for the Co component, and a predicted picture for the Cg component. Alternatively, the intra prediction unit 106 predicts blocks constituting the current picture from adjacent pixels for each of the R component, G component, and B component indicated by the prediction direction selected by the intra prediction mode selection unit 105 and generates a predicted picture for the R component, a predicted picture for the G component, and a predicted picture for the B component.

The subtractor 107 generates first residual data corresponding to differences between the current picture and the predicted picture for each of the color components generated by the motion compensation unit 104 or by the intra prediction unit 106. For example, the subtractor 107 generates the first residual data for the Y component, the first residual data for the Co component, and the first residual data for the Cg component by calculating differences between the current picture and the predicted picture for each of the Y component, Co component, and Cg component that are generated by the motion compensation unit 104 or by the intra prediction unit 106. Alternatively, the subtractor 107 generates the first residual data for the R component, the first residual data for the G component, and the first residual data for the B component by calculating differences between the current picture and the predicted picture for each of the R component, G component, and B component that are generated by the motion compensation unit 104 or by the intra prediction unit 106.

Figure 5:
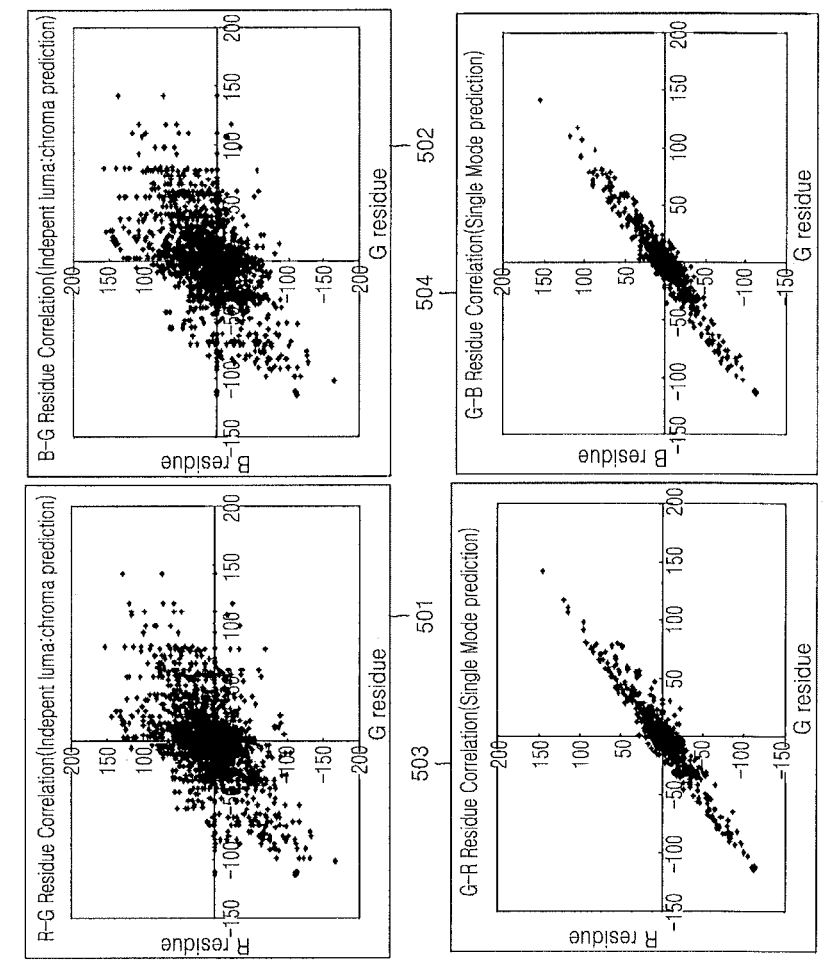
FIG. 5 illustrates changes in correlation between residual data when a single prediction mode is applied to different color components in an embodiment according to the present invention.

FIG. 5 illustrates changes in correlation between residual data when a single prediction mode is applied to different color components in an embodiment according to the present invention.

Referring to FIG. 5, plots 501 and 502 illustrate the correlation between residual data obtained by applying independent prediction modes to the color components. In particular, plot 501 illustrates the correlation between residual data for the R component and the G component, and plot 502 illustrates the correlation between residual data for the B component and the G component. Meanwhile, plots 503 and 504 illustrate the correlation between residual data obtained by applying a signal prediction mode to all the color components. In particular, plot 503 illustrates the correlation between residual data for the R component and G component, and plot 504 illustrates the correlation between residual data for the B component and the G component. As is apparent from the plots 501 through 504 in FIG. 5, the correlation between residual data for color components is higher when a single prediction mode is applied to all the color components than when independent prediction modes are applied to the all the color components.

The residue transform unit 108 of FIG. 1 generates second residual data corresponding to differences between the first residual data generated by the subtractor 107 of FIG. 1. In the present embodiment, to increase the coding efficiency for moving pictures, redundancy between the color components that remains after the prediction or intra prediction is utilized. The inter prediction utilizes temporal redundancy, and the intra prediction utilizes spatial redundancy. However, redundancy between the color components still remains after the inter prediction or intra prediction.

Figure 6:
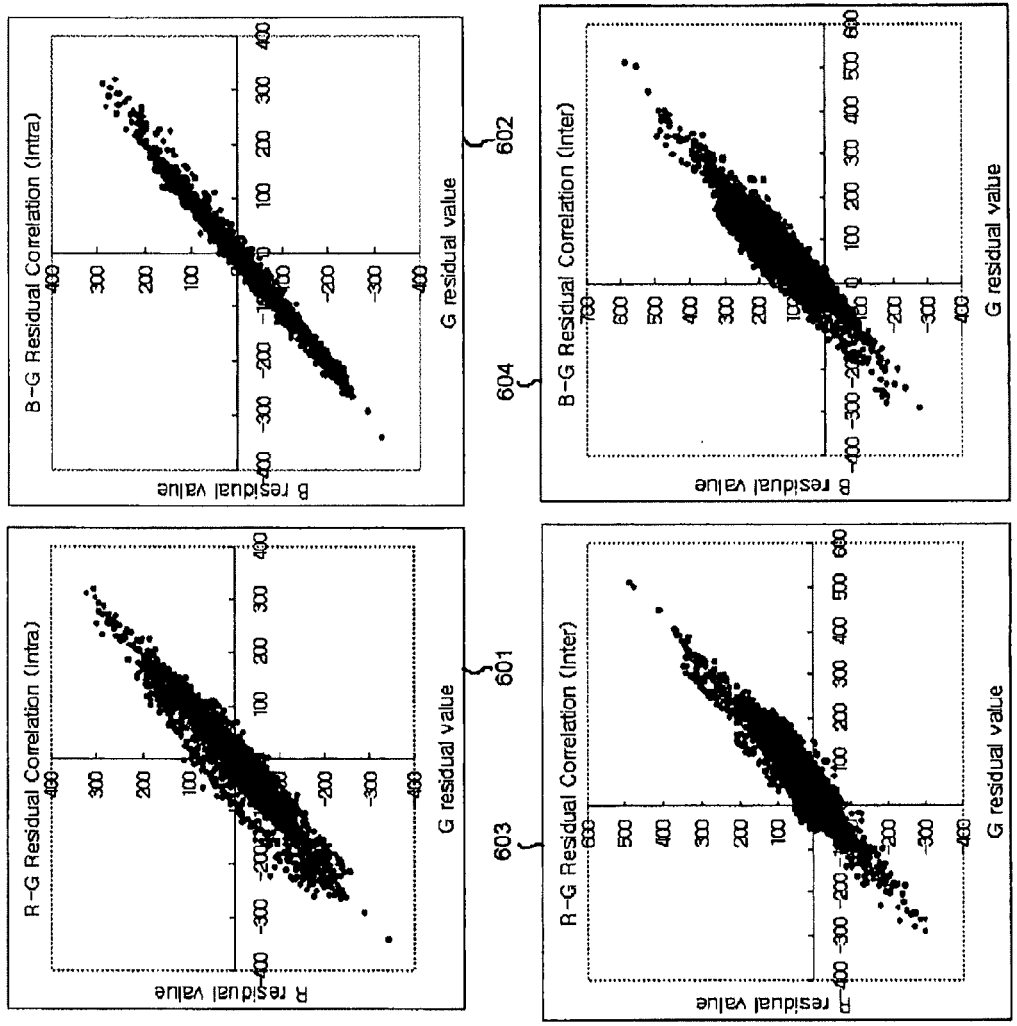
FIG. 6 illustrates the correlation between color components when a single prediction mode is applied to all the color components in an embodiment of the present invention.

FIG. 6 illustrates the correlation between color components when a single prediction mode is applied to all the color components in an embodiment of the present invention.

Referring to FIGS. 1 and 6, plot 601 illustrates the correlation between the R component and the G component after intra prediction. Plot 602 illustrates the correlation between the B component and the G component after intra prediction. Plot 603 illustrates the correlation between the R component and the G component after inter prediction, and plot 604 illustrates the correlation between the B component and the G component after inter prediction. As is apparent from the plots 601 through 604 in FIG. 6, there still remains a strong correlation between the residual data for the color components after the inter prediction or intra prediction.

In other words, the residue transform unit 108 generates second residual data corresponding to differences between the first residual data for each of the Y component, the Co component, and the Cg component in the YCgCo color space using Equation Set (1) below. In particular, Y=(R+2G+B)>>2, Co=(R−B)>>1, and Cg=(−R+2G−B)>>2.

$$\Delta^2 B = \Delta R - \Delta B$$

$$t = \Delta B + (\Delta^2 B >> 1)$$

$$\Delta^2 R = \Delta G - t$$

$$\Delta^2 G = t + (\Delta^2 R >> 1) \quad \text{Equation Set (1)}$$

Here, $\Delta X$ denotes first residual data, $\Delta^2 X$ denotes second residual data, the notation ">>" denotes right shift operation, which approximates a division by 2, and variable t is used to the purpose of temporary calculation.

Alternatively, the residue transform unit 108 generates second residual data corresponding to differences between the first residual data for each of the R component, the G component, and the B component in the RGB color space using Equation Set (2) below.

$$\Delta^2 G = \Delta G'$$

$$\Delta^2 R = \Delta R - \Delta G'$$

$$\Delta^2 B = \Delta B - \Delta G' \quad \text{Equation Set (2)}$$

Here, $\Delta X$ denotes first residual data, $\Delta^2 X$ denotes second residual data, and $\Delta X'$ denotes reconstructed first residual data. Equation (2) is effective when the G component has a large amount of picture information. The second residual data can be calculated using the R component or B component as a dominant component.

The frequency domain transform unit 109 transforms the second residual data in the color space generated by the residue transform unit 108 into second residual data in a frequency domain. According to H.264/MPEG-4 AVC, discrete hadamard transform (DHT), discrete cosine transform (DCT)-based integer transform, etc., are used as schemes for transform from the color space to the frequency domain.

The quantization unit 110 quantizes the frequency component values transformed by the frequency domain transform unit 109. In particular, the quantization unit 110 divides the frequency component values transformed by the frequency domain transform unit 109 by a quantization parameter and approximates the divided results to integer values.

The entropy coding unit 111 generates a bitstream by entropy-coding the quantized values obtained by the quantization unit 110 and outputs the bitstream. According to H.264/MPEG-4 AVC, context-adaptive variable length coding (CAVLC), context-adaptive binary arithmetic coding (CABAC), etc., are used as entropy coding schemes.

The dequantization unit 112 dequantizes the quantized values obtained by the quantization unit 110. In particular, the dequantization unit 112 reconstructs the frequency domain values by multiplying the integer values approximated by the quantization unit 110 by the quantization parameter.

The frequency domain inverse transform unit 113 reconstructs the second residual data by transforming the frequency component values in the frequency domain reconstructed by the dequantization unit 112 into data in the color space.

The residue inverse transform unit 114 generates first residual data corresponding to the sum of the second residual data reconstructed by the frequency domain inverse transform unit 113. In particular, the residue inverse transform unit 114 generates first residual data corresponding to the sum of the second residual data for each of the Y component, Co component, and Cg component in the YCgCo color space using Equation Set (3) below.

$$t = \Delta^2 G' - (\Delta^2 R' - 1)$$

$$\Delta G' = \Delta^2 R' + t$$

$$\Delta B' = t - (\Delta^2 B' - 1)$$

$$\Delta R' = \Delta B' + \Delta^2 B' \quad \text{Equation Set (3)}$$

Here, $\Delta X'$ denotes reconstructed first residual data and $\Delta^2 X'$ denotes reconstructed second residual data.

Alternatively, the residue inverse transform unit 114 generates first residual data corresponding to the sum of the second residual data for each of the R component, G component, and B component in the RGB color space, using Equation Set (4) below.

$$\Delta G' = \Delta^2 G'$$

$$\Delta R' = \Delta^2 R' + \Delta G'$$

$$\Delta B' = \Delta^2 B' + \Delta G' \qquad \text{Equation Set (4)}$$

Here, ΔX' denotes reconstructed first residual data, and Δ²X' denotes reconstructed second residual data.

The adder 115 generates a reconstructed picture corresponding to the sum of the predicted pictures generated by the motion compensation unit 104 or the intra prediction unit 106 and the first residual data generated by the residue inverse transform unit 114. For example, the adder 115 generates a reconstructed picture in the YCgCo color space by calculating the sum of the predicted pictures for the Y component, Co component, and Cg component generated by the motion compensation unit 104 or the intra prediction unit 106 and the first residual data generated by the residue inverse transform unit 114. Alternatively, the adder 115 generates a reconstructed picture in the RGB color space by calculating the sum of the predicted pictures for the component, G component, and B component generated by the motion compensation unit 104 or the intra prediction unit 106 and the first residual data generated by the residue inverse transform unit 114.

The filter 116 improves the quality of the reconstructed picture by smoothing distortion at block boundaries in the reconstructed picture generated by the adder 115. However, the filter 116 is not used for a high bit rate moving picture because high frequency components are likely to be lost.

Although the moving picture coding apparatus in FIG. 1 uses a scheme of adaptively applying a color space and a single mode scheme, it is to be understood that a moving picture coding apparatus using one of the two schemes is also possible.

Figure 7:
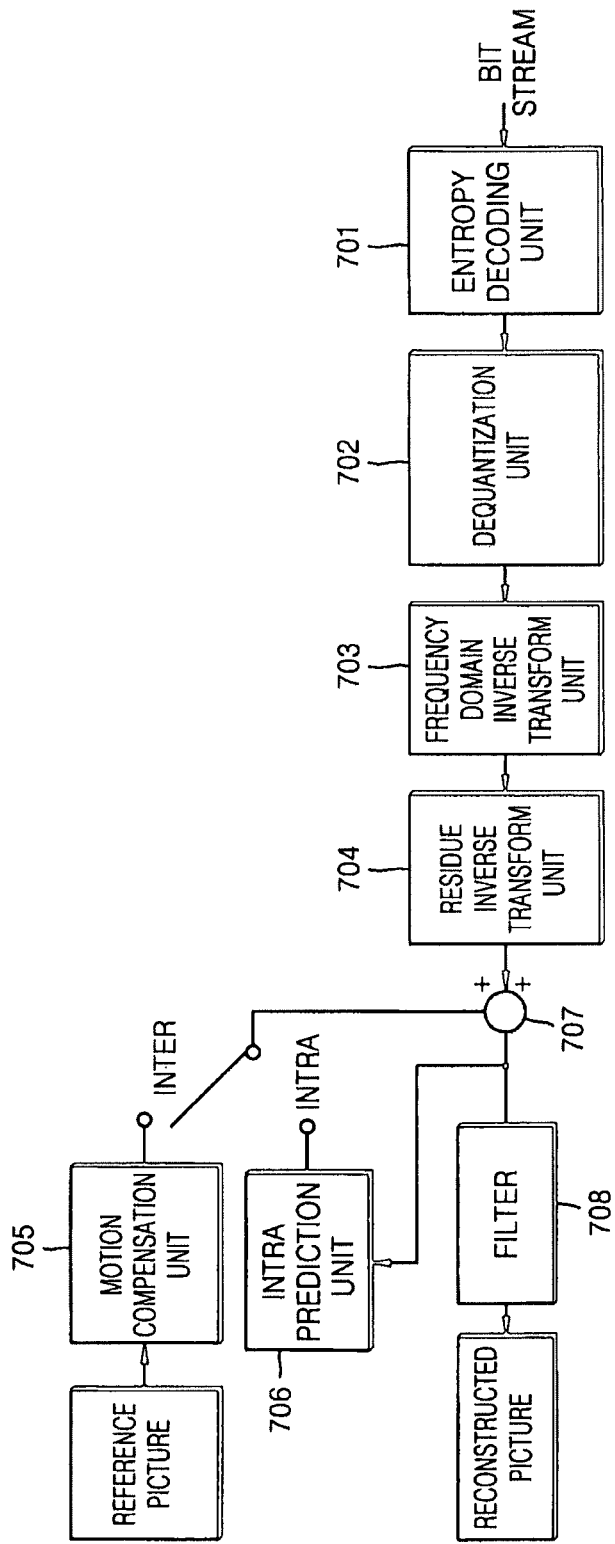
FIG. 7 is a block diagram of a moving picture decoding apparatus according to an embodiment of the present invention.

FIG. 7 is a block diagram of a moving picture decoding apparatus according to an embodiment of the present invention.

Referring to FIG. 7, a moving picture decoding apparatus according to an embodiment of the present invention includes an entropy decoding unit 701, a dequantization unit 702, a frequency domain inverse transform unit 703, a residue inverse transform unit 704, a motion compensation unit 705, an intra prediction unit 706, an adder 707, and a filter 708.

The entropy decoding unit 701 reconstructs integer values by entropy-decoding an input bitstream output from, by way of a non-limiting example, the moving picture coding apparatus of FIG. 1.

The dequantization unit 702 dequantizes the integer values reconstructed by the entropy decoding unit 701 to reconstruct frequency component values. In particular, the dequantization unit 702 reconstructs the frequency component values by multiplying the integer values reconstructed by the entropy decoding unit 701 by a quantization parameter.

The frequency domain inverse transform unit 703 transforms the frequency component values in the frequency domain reconstructed by the dequantization unit 702 into data in the color space used in the moving picture coding apparatus to reconstruct second residual data corresponding to the differences between the residual data for each of the color components constituting the color space.

The residue inverse transform unit 704 generates first residual data corresponding to the sum of the second residual data in the color space used in the moving picture coding apparatus that are reconstructed by the frequency domain inverse transform unit 703. In particular, the residue inverse transform unit 704 generates first residual data corresponding to the sum of the second residual data for each of the Y component, Co component, and Cg component in the YCgCo color space, using Equation set (3). Alternatively, the residue inverse transform unit 704 generates first residual data corresponding to the sum of the second residual data for each of the R component, G component, and B component in the RGB color space using Equation Set (4).

The motion compensation unit 705 compensates for the motion between the current picture and the reference picture according to the inter prediction mode used in the moving picture coding apparatus. In other words, the motion compensation unit 705 compensates for the motion between the current picture and the reference picture according to inter prediction modes independently applied to the color components of the color space or an inter prediction mode commonly applied to all the color components of the color space.

In other words, the motion compensation unit 705 compensates for the motion between the current picture and the reference picture according to a single inter prediction mode commonly applied to all the color components. In particular, the motion compensation unit 705 generates predicted pictures for the current picture using motion vectors, which are independently applied to the color components in units of blocks that are independent for the color components. Alternatively, the motion compensation unit 705 generates predicted pictures for the current picture using a single motion vector, which is commonly applied to all the color components in units of blocks that are common to the color components. In other words, the motion compensation unit 705 generated predicted pictures for the current picture from the reference picture in units of blocks corresponding to the size of blocks commonly applied to all the color components using the motion vector commonly applied to all the color components.

The intra prediction unit 706 predicts blocks constituting the current picture from adjacent pixels in a picture reconstructed by the adder 707, according to the intra prediction mode used in the moving picture coding apparatus, and generates predicted pictures constituted by the predicted blocks. In other words, the intra prediction unit 706 predicts blocks constituting the current picture from adjacent pixels in a picture reconstructed by the adder 707, according to the intra prediction modes independently applied to the color components or a intra prediction mode commonly applied to all the color components, and generates predicted pictures constituted by the predicted blocks. In particular, the intra prediction unit 706 predicts blocks constituting the current picture from adjacent pixels indicated by the prediction direction used in the moving picture coding apparatus and generates predicted pictures constituted by the predicted blocks. In other words, the intra prediction unit 706 predicts blocks constituting the current picture from adjacent pixels indicated by the prediction directions, which are independently applied to the color components in units of blocks that are independent for the color components, and generates predicted pictures constituted by the predicted blocks. Alternatively, the intra prediction unit 706 predicts blocks constituting the current picture in units of blocks corresponding to the size of blocks commonly applied to all the color components, from adjacent pixels for each of the color components indicated by the prediction direction commonly applied to all the color components.

The adder 707 generates a reconstructed picture corresponding to the sum of the predicted pictures generated by the motion compensation unit 705 or the intra prediction unit 706 and the first residual data generated by the residue inverse transform unit 704. For example, the adder 707 generates a reconstructed picture in the YCgCo color space by calculating the sum of the predicted pictures for the Y component, Co component, and Cg component generated by the motion compensation unit 705 or the intra prediction unit 706 and the first residual data generated by the residue inverse transform unit 704. Alternatively, the adder 707 generates a reconstructed picture in the RGB color space by calculating the sum of the predicted pictures for the R component, G component, and B component generated by the motion compensation unit 705 or the intra prediction unit 706 and the first residual data generated by the residue inverse transform unit 704.

The filter 708 improves the quality of the reconstructed picture by smoothening distortion at block boundaries in the reconstructed picture generated by the adder 707. However, the filter 708 is not used for a high bit rate moving picture because high frequency components are likely to be lost.

Figure 8A:
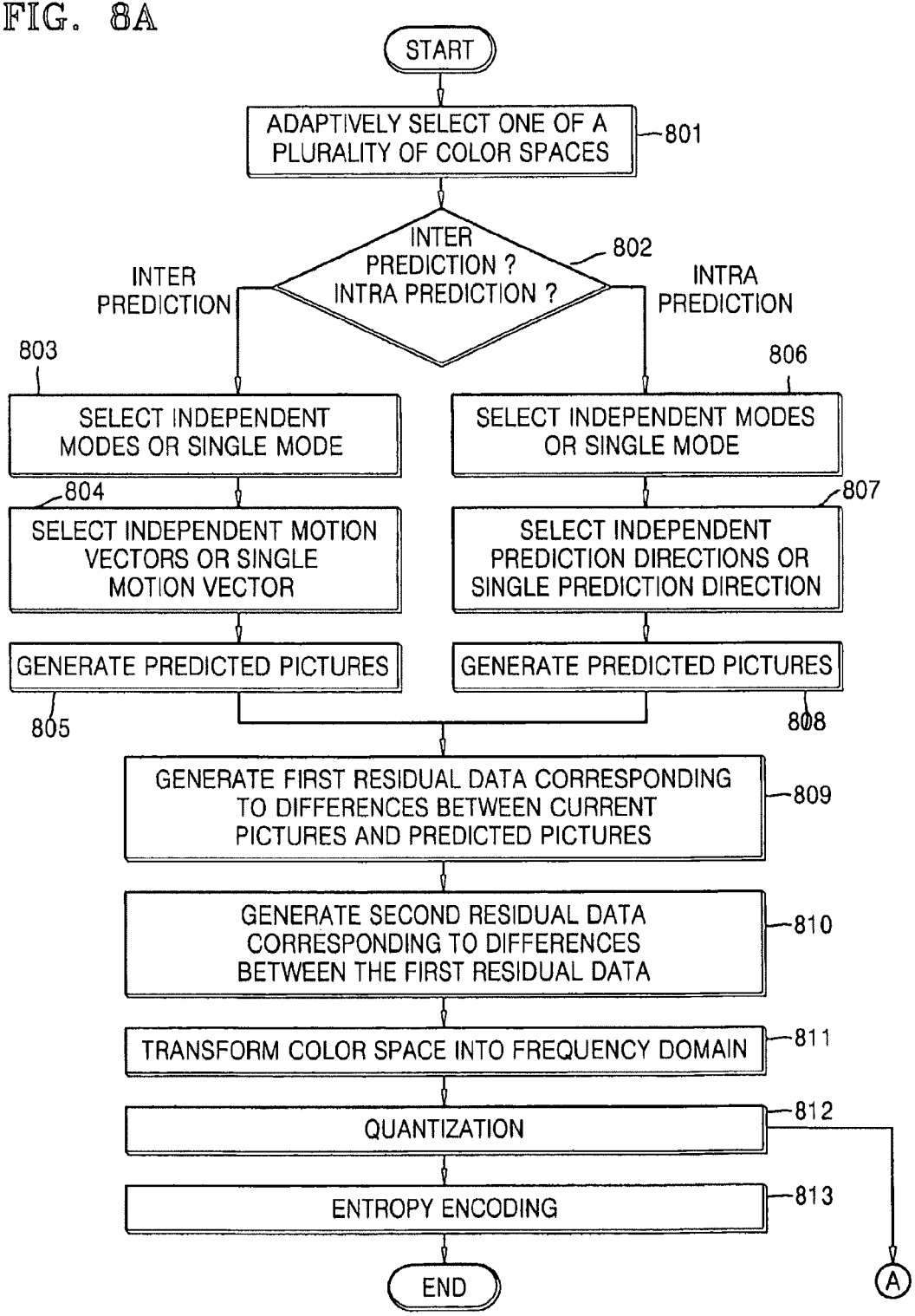
FIGS. 8A and 8B are flowcharts of a moving picture coding method according to an embodiment of the present invention.
Figure 8B:
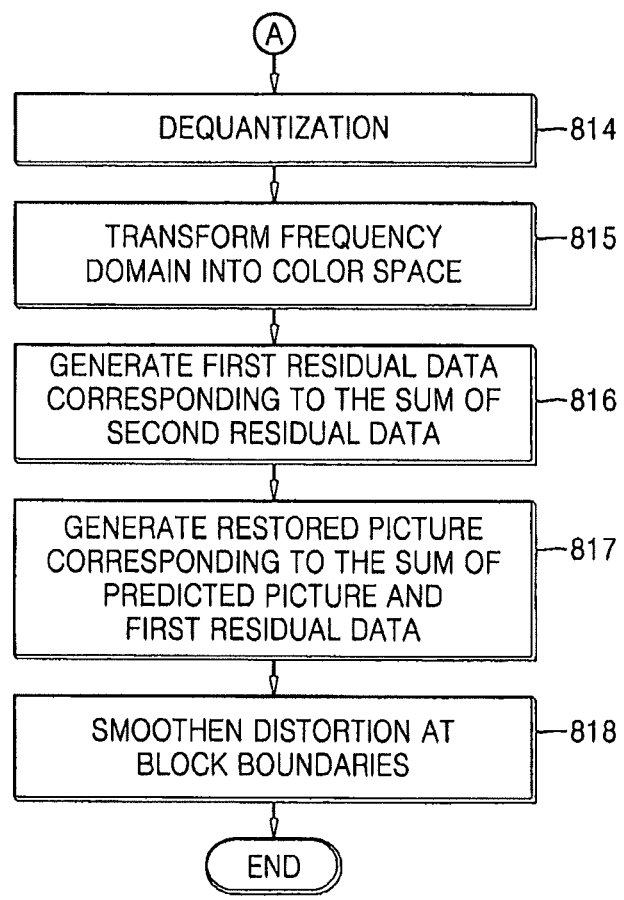

FIGS. 8A and 8B are flowcharts of a moving picture coding method according to an embodiment of the present invention.

Referring to FIGS. 8A and 8B, a moving picture coding method according to an embodiment of the present invention includes operations performed in time-series in the moving picture coding apparatus of FIG. 1. The descriptions of the moving picture coding apparatus with reference to FIG. 1 apply to the moving picture coding method in the present embodiment, and thus the descriptions thereof will not be repeated here.

In operation 801, the moving picture coding apparatus selects a color space from among a plurality of color spaces based on the characteristics of a current picture.

In operation 802, the moving picture coding apparatus determines whether to perform inter prediction or intra prediction. Operation 803 is performed for inter prediction, or operation 806 is performed for intra prediction.

In operation 803, the moving picture coding apparatus selects inter prediction modes to independently applied to the color components constituting the color space selected in operation 801 or an inter prediction mode to be commonly applied to all the color components constituting the color space selected in operation 801.

In operation 804, the moving picture coding apparatus selects motion vectors to be independently applied to the color components constituting the color space or selects a motion vector to be commonly applied to all the color components constituting the color space according to the inter prediction mode selected in operation 803.

In operation 805, the moving picture coding apparatus generates predicted pictures for the current picture from a reference picture using the motion vector selected in operation 804.

In operation 806, the moving picture coding apparatus selects intra prediction modes to independently applied to the color components constituting the color space selected in operation 801 or a intra prediction mode to be commonly applied to all the color components constituting the color space selected in operation 801.

In operation 807, the moving picture coding apparatus selects prediction directions to be independently applied to the color components constituting the color space, or selects a prediction direction to be commonly applied to all the color components constituting the color space from among predicted directions for the color components, according to the intra prediction mode selected in operation 806.

In operation 808, the moving picture coding apparatus predicts blocks constituting the current picture from adjacent pixels indicated by the predicted direction selected in operation 807 and generates predicted pictures constituted by the predicted blocks.

In operation 809, the moving picture coding apparatus generates first residual data corresponding to differences between the current picture and the predicted picture for each of the color components generated in operation 805 or 808.

In operation 810, the moving picture coding apparatus generates second residual data corresponding to differences between the first residual data.

In operation 811, the moving picture coding apparatus transforms the second residual data in the color space generated in operation 810 into values in a frequency domain.

In operation 812, the moving picture coding apparatus quantizes the values transformed in operation 811.

In operation 813, the moving picture coding apparatus generates a bitstream by entropy-coding the values quantized in operation 812 and outputs the bitstream.

In operation 814, the moving picture coding apparatus reconstructs frequency component values by dequantizing the values quantized in operation 812.

In operation 815, the moving picture coding apparatus reconstructs the second residual data by transforming the frequency component values reconstructed in operation 814 into data in the color space.

In operation 816, the moving picture coding apparatus generates first residual data corresponding to the sum of the second residual data reconstructed in operation 815.

In operation 817, the moving picture coding apparatus generates a reconstructed picture corresponding to the sum of the predicted pictures for the color components generated in operation 805 or 808 and the first residual data generated in operation 816.

In operation 818, the moving picture coding apparatus improves the quality of the reconstructed picture by smoothening distortion at block boundaries in the reconstructed picture generated in operation 816.

Figure 9:
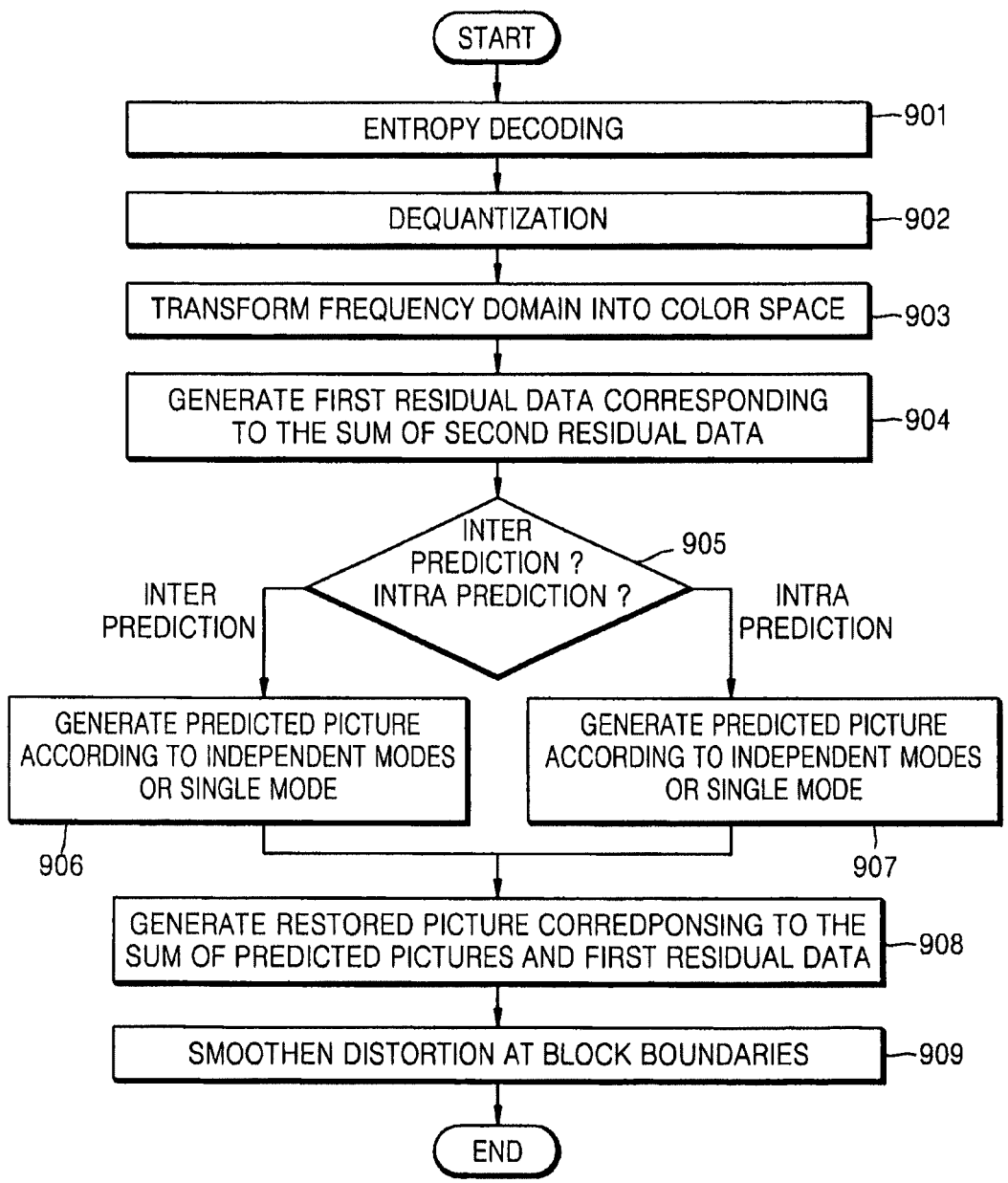
FIG. 9 is a flowchart of a moving picture decoding method according to an embodiment of the present invention.

FIG. 9 is a flowchart of a moving picture decoding method according to an embodiment of the present invention.

Referring to FIG. 9, a moving picture decoding method according to an embodiment of the present invention includes operations performed in time-series in the moving picture decoding apparatus of FIG. 7. The descriptions of the moving picture decoding apparatus with reference to FIG. 7 apply to the moving picture decoding method in the present embodiment, and thus the descriptions thereof will not be repeated here.

In operation 901, the moving picture decoding apparatus reconstructs integer values by entropy-decoding the bitstream output from a moving picture coding apparatus such as, by way of a non-limiting example, that of FIG. 1.

In operation 902, the moving picture decoding apparatus reconstructs frequency component values by dequantizing the integer values reconstructed in operation 902.

In operation 903, the moving picture decoding apparatus reconstructs the second residual data corresponding to the differences between the first residual data constituting the color space used in the moving picture coating apparatus among a plurality of color spaces by transforming the frequency component values in the frequency domain reconstructed in operation 902 into data in the color space used in the moving picture coding apparatus.

In operation 904, the moving picture decoding apparatus generates first residual data corresponding to the sum of the second residual data reconstructed in operation 903 in the color spaced used in the moving picture coding apparatus.

In operation 905, the moving picture coding apparatus determines whether to perform inter prediction or intra prediction. Operation 906 is performed for inter prediction, or operation 907 is performed for intra prediction.

In operation 906, the moving picture decoding apparatus compensates for the motion between a current picture and a reference picture according to inter prediction modes independently applied to the color components constituting the color space or an inter prediction mode commonly applied to all the color components.

In operation 907, the moving picture decoding apparatus predicts blocks constituting the current picture from adjacent pixels in a reconstructed picture according to the inter prediction modes independently applied to the color components or the single inter prediction mode commonly applied to the color components, and generates a predicted picture constituted by the predicted blocks.

In operation 908, the moving picture decoding apparatus generates a reconstructed picture corresponding to the sum of the predicted pictures generated in operation 906 or 907 and the first residual data generated by the residue inverse transform unit 704.

In operation 909, the moving picture decoding apparatus improves the quality of the reconstructed picture generated in operation 908 by smoothening distortion at block boundaries in the reconstructed picture.

FIG. 10 is the results of a simulation test according to embodiments of the present invention.

As is apparent from Table 1001 and Table 1002 in FIG. 10, in the simulation test, RCT and IPP were performed in a single prediction mode. The results were compared with the results of coding according to H.264/MPEG-4 AVC FRExt. JM9.3 reference software was used for the simulation test. The test conditions are as follows. Film and Viper sequences (1920×1088@24 Hz, progressive) were used as a test material, the search range was 64, quantization parameters were 12, 18, 24, 30, and 36, the number of reference pictures, i.e., reference frames, was 3, an entropy coding scheme was CABAC, the RD-optimized mode selection was "ON", the GOP (Group of Pictures) structure was IBBP, and the number of slice groups was 1.

The methods used in the simulation test are as follows. IPP is a method according to an embodiment of the present invention using IPP and single mode prediction, RCT is a method according to an embodiment of the present invention using RCT and single mode prediction, RCT (FREXT) is RGB coding using YCgCo for residual color transform, and YCgCo is external YCgCo coding in which RGB input data are converted to YCgCo before being coded. In particular, to evaluate the fidelity of the reconstructed RGB images, the average of peak signal to noise rates (PSNR) of all the color components, i.e., the average of RGB components, was measured. The results are shown in Table 1001 of FIG. 10. In addition, the PSNR gain in each of the methods over the YCgCo method at two high bit-rates (20 Mbps and 60 Mbps) appears in Table 1001. As shown in Table 1002, the results of Y PSNR in YCgCo domain with approximately equal fidelity for chroma channels were compared in order to isolate the effect on a luma channel (most important channel).

Figure 11:
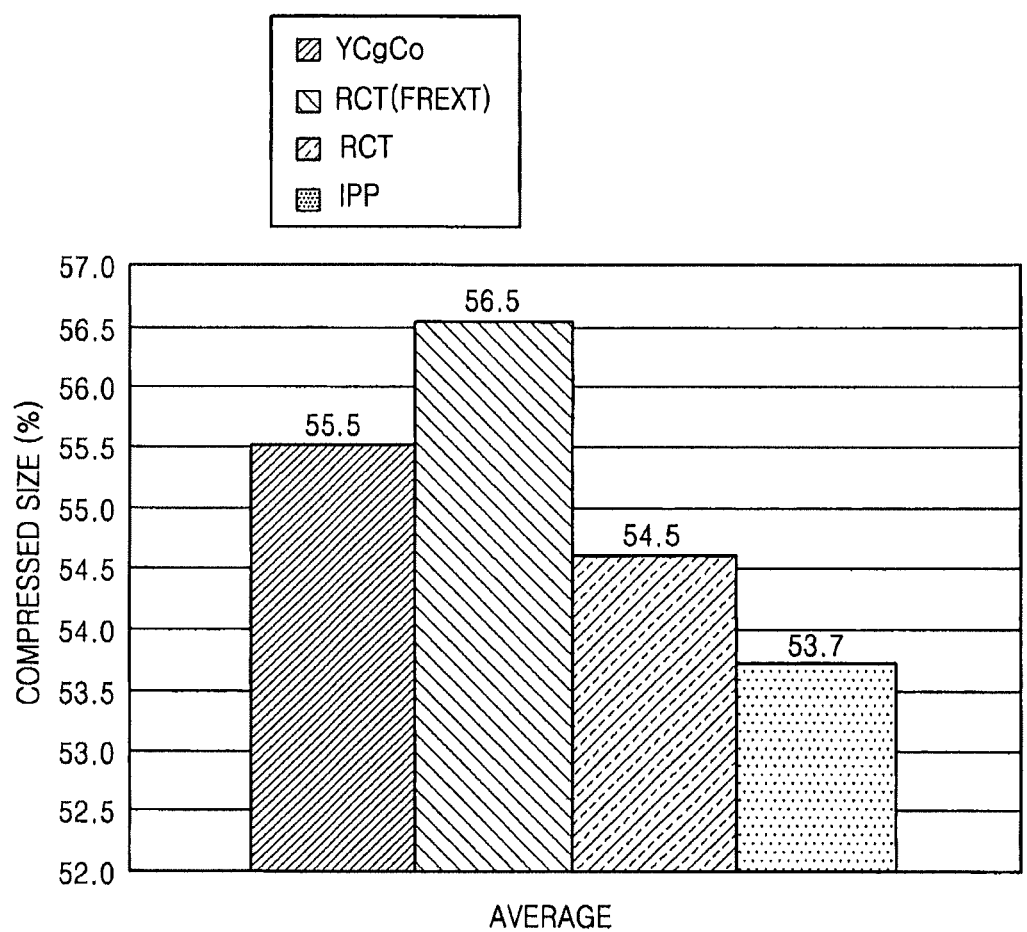
FIG. 11 is a graph comparatively showing the coding efficiencies in a lossless mode in embodiments according to the present invention.

FIG. 11 is a graph comparatively showing the coding efficiencies of various methods according to embodiments of the present invention in a lossless mode.

In the near future, it will be important to support lossless and near-lossless video compression. In H.264/MPEG-4 AVC FRExt, lossless coding can be achieved by skipping frequency domain transform and quantization. The methods according to en embodiment of the present invention can be applied to lossless coding when frequency domain transform and quantization are skipped. As is apparent from FIG. 11, the efficiency of the method using IPP and single mode prediction is highest in lossless coding.

Figure 12A:
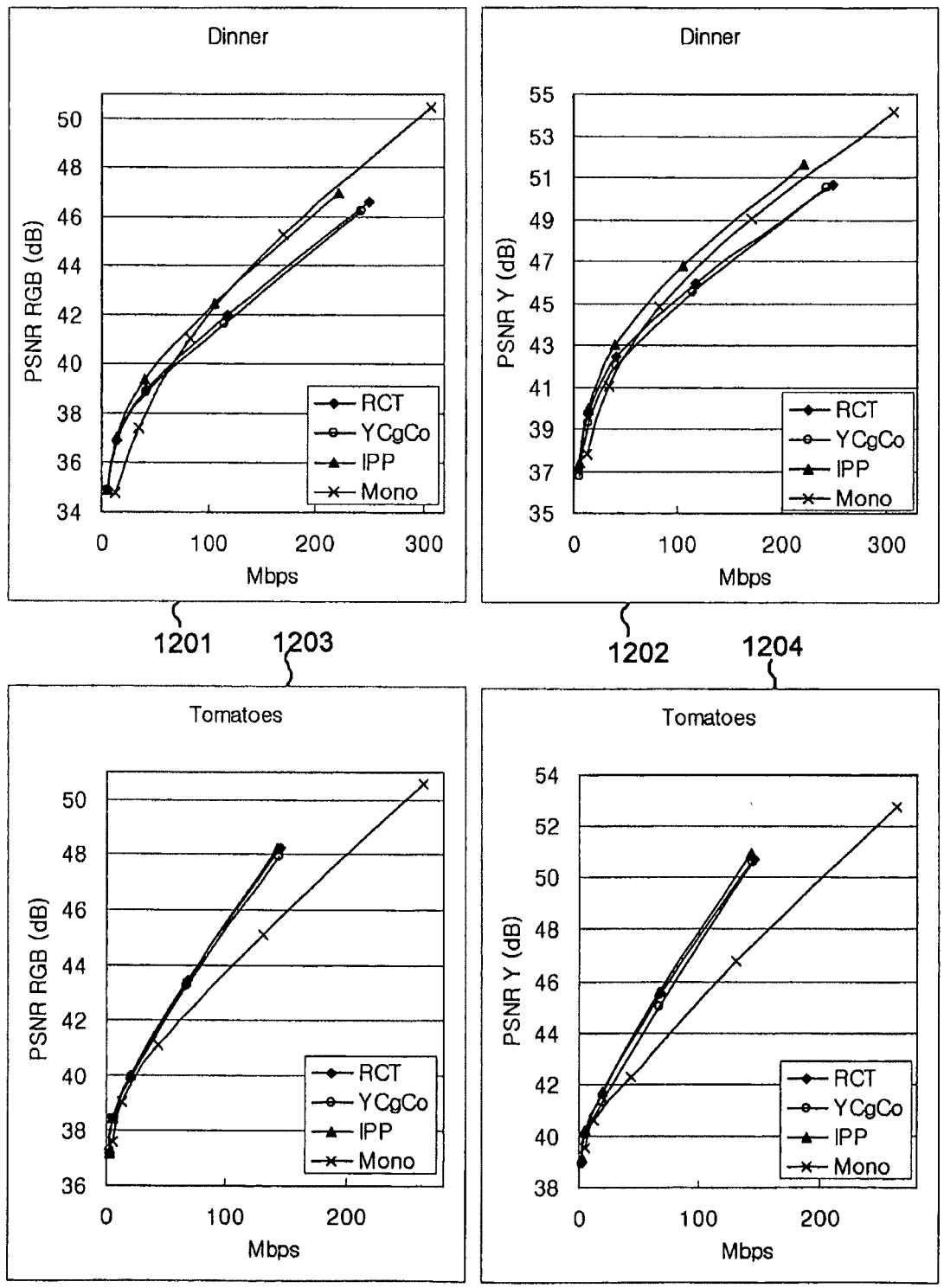
FIGS. 12A and 12B are rate distortion (RD) curves obtained through a simulation of embodiments of the present invention.
Figure 12B:
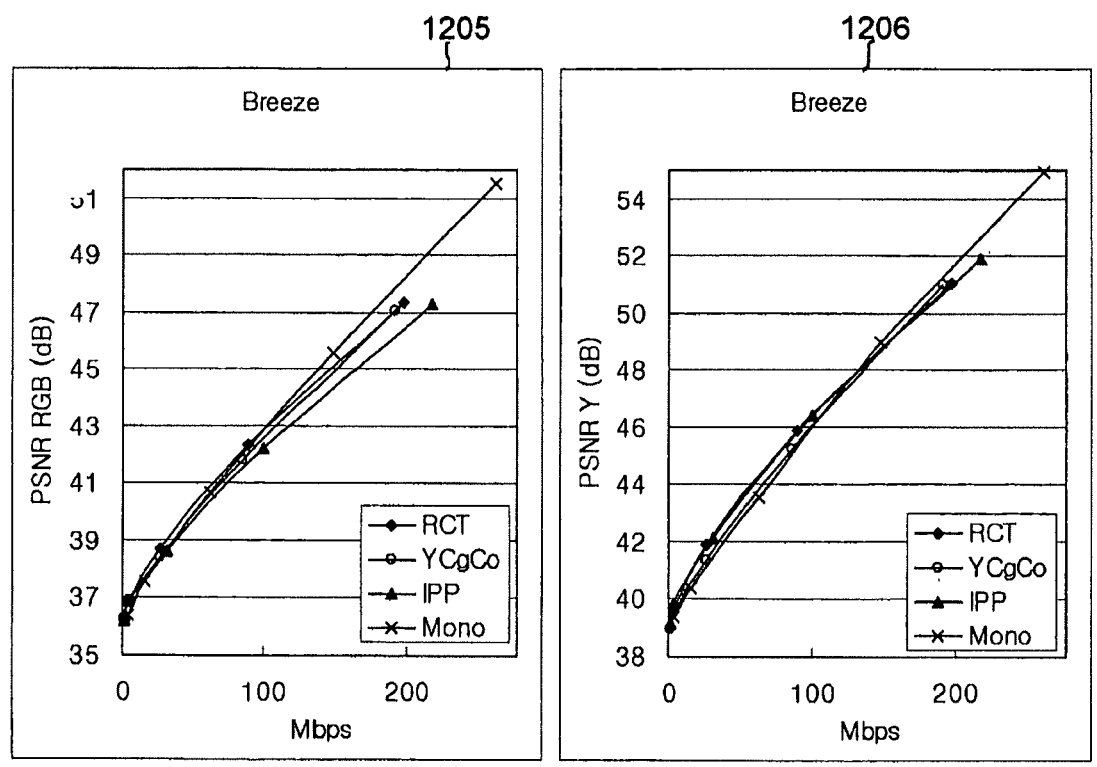

FIGS. 12A and 12B are rate distortion (RD) curves obtained through simulation of embodiments of the present invention.

In this simulation, only intra coding was performed. In particular, to evaluate the coding performance when independent intra prediction modes are used, all the color components were treated as monochromatic images.

Embodiments of the present invention can be written as computer programs and can be implemented in general-use digital computers that execute the programs using a computer readable recording medium. In addition, the data structures used in the embodiments of the present invention can be written to a computer readable medium by various means. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

According to the above-described embodiments of the present invention, since residual data are generated according to a single prediction mode commonly applied to all the color components, the correlation between the residual data is high. As a result, the coding efficiency of moving pictures increases. In addition, according to the present invention, the coding efficiency of a moving picture can be increased using a single color space adaptively selected among a plurality of color spaces according to the characteristics of the moving picture. Furthermore, according to the present invention, the coding efficiency of moving pictures can be maximized by applying all the methods described above.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image decoding method comprising:
   obtaining information about a color representation from a bitstream;
   entropy decoding a residue which corresponds to a difference between a current image and a predicted image of the current image; and
   reconstructing the current image by using the entropy decoded residue and the predicted image, based on the information about the color representation,
   wherein the reconstructing of the current image comprises:
   obtaining a prediction direction of a chroma component from among a plurality of prediction modes associated with a prediction direction of a luma component, wherein the plurality of prediction modes include a first mode in which the prediction direction of the chroma component is identical to the prediction direction of the luma component and a second mode in which the prediction direction of the chroma component is different from the prediction direction of the luma component; and
   obtaining the predicted image based on the prediction direction of the luma component and the prediction direction of the chroma component.

2. The method of claim 1, wherein the information about the color representation indicates a color space into which color components are represented.

\* \* \* \* \*